United States Patent
Sikiguchi et al.

(10) Patent No.: US 8,212,963 B2
(45) Date of Patent: Jul. 3, 2012

(54) LIQUID CRYSTAL DISPLAY DEVICE COMPRISING A DIFFUSER BOARD WHICH INCLUDES A PLURALITY OF MICRO LENSES

(75) Inventors: Yoshifumi Sikiguchi, Hitachiota (JP); Ikuo Hiyama, Hitachinaka (JP); Hiroki Kaneko, Hitachinaka (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 412 days.

(21) Appl. No.: 12/136,153

(22) Filed: Jun. 10, 2008

(65) Prior Publication Data
US 2008/0303977 A1    Dec. 11, 2008

(30) Foreign Application Priority Data
Jun. 11, 2007    (JP) .................. 2007-154010

(51) Int. Cl.
*G02F 1/1335* (2006.01)
*F21V 7/04* (2006.01)
(52) U.S. Cl. ............. 349/64; 349/95; 349/112; 362/613; 362/626
(58) Field of Classification Search .............. 349/64, 349/112, 62, 95; 362/613, 626, 561
See application file for complete search history.

(56) References Cited

U.S. PATENT DOCUMENTS

| | | | |
|---|---|---|---|
| 2005/0201101 A1* | 9/2005 | Shimura | 362/330 |
| 2005/0231106 A1 | 10/2005 | Tanaka et al. | |
| 2005/0265029 A1* | 12/2005 | Epstein et al. | 362/339 |
| 2006/0050200 A1* | 3/2006 | Nagao | 349/65 |
| 2006/0091406 A1 | 5/2006 | Kaneko et al. | |
| 2006/0176424 A1 | 8/2006 | Kajita et al. | |
| 2006/0256255 A1* | 11/2006 | Minami | 349/65 |
| 2006/0290627 A1 | 12/2006 | Konno et al. | |
| 2007/0002552 A1* | 1/2007 | Tseng | 362/29 |
| 2007/0035969 A1 | 2/2007 | Kaneko et al. | |
| 2007/0051960 A1* | 3/2007 | Yu | 257/88 |
| 2007/0085944 A1 | 4/2007 | Tanaka et al. | |
| 2007/0097709 A1* | 5/2007 | Hsieh | 362/620 |
| 2007/0187705 A1 | 8/2007 | Tanaka et al. | |
| 2007/0189042 A1* | 8/2007 | Pai et al. | 362/632 |
| 2008/0002403 A1* | 1/2008 | Kim | 362/240 |

FOREIGN PATENT DOCUMENTS

| | | |
|---|---|---|
| JP | 2005-302336 | 10/2005 |
| JP | 2006-91821 | 4/2006 |
| JP | 2006-100225 | 4/2006 |
| JP | 2006-134996 | 5/2006 |

(Continued)

*Primary Examiner* — Mark Robinson
*Assistant Examiner* — Dennis Y Kim
(74) *Attorney, Agent, or Firm* — Antonelli, Terry, Stout & Kraus, LLP.

(57) ABSTRACT

An object of the present invention is to provide a liquid-crystal display device which includes a diffuser board that does not produce striped mura on the surface of a liquid crystal panel even if point light sources are used as light sources of a backlight.

A backlight apparatus 103 is provided with a diffuser board 103b having diffusion portions 103b1. At each of the diffusion portions 103b1, the light L emitted by a LED module 104 included in a light source unit 103a is reflected by prism patterns P and diffused around the LED module 104. Then, the diffused light is reflected again by a reflecting surface formed on the inner surface of a housing 103c and emitted from the backlight apparatus 103, thereby achieving illuminating light without mura.

9 Claims, 13 Drawing Sheets

FOREIGN PATENT DOCUMENTS

| | | |
|---|---|---|
| JP | 2006-302876 | 11/2006 |
| JP | 2006-310150 | 11/2006 |
| JP | 2007-3805 | 1/2007 |
| JP | 2007-36073 | 2/2007 |
| JP | 2007-95386 | 4/2007 |
| JP | 2007-140453 | 6/2007 |
| JP | 2007-163810 | 6/2007 |
| JP | 2007-192950 | 8/2007 |
| JP | 2007-220765 | 8/2007 |

* cited by examiner

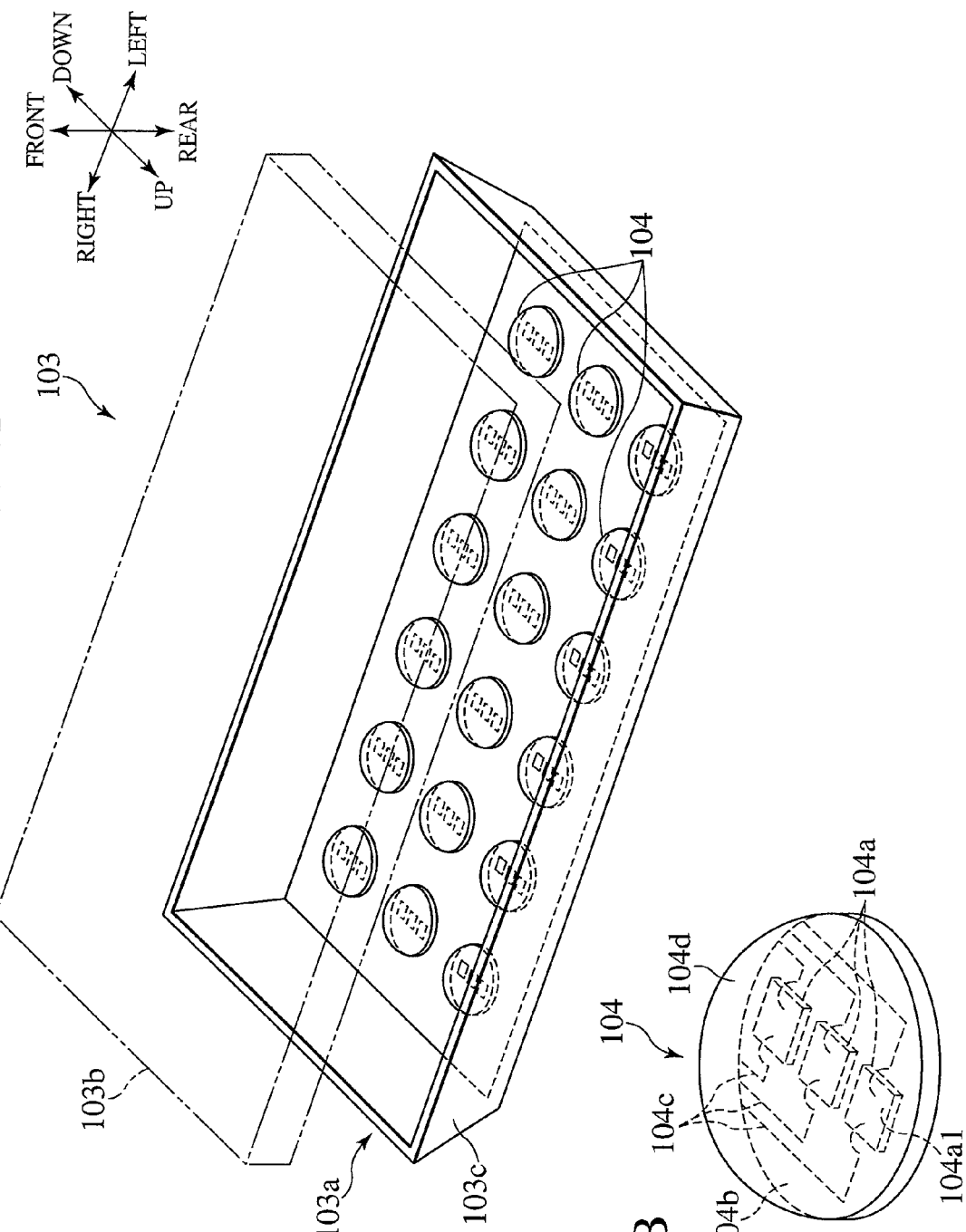

LIQUID CRYSTAL DISPLAY DEVICE COMPRISING A DIFFUSER BOARD WHICH INCLUDES A PLURALITY OF MICRO LENSES

BACKGROUND OF THE INVENTION

1. Field of the Invention

The present invention relates to a liquid-crystal display device.

2. Description of the Related Art

In recent years, an increasing number of light-emitting-type plasma display panels and non-light-emitting-type liquid-crystal display devices have been used as display devices instead of Cathode Ray Tubes (CRT).

Of these display devices, a liquid-crystal display device uses a liquid crystal panel as a transmissive light modulation device and includes an illuminating device (also referred to as a backlight) on the back surface of the liquid crystal panel to irradiate the liquid crystal panel with light. The liquid crystal panel forms an image by controlling the transmission of the light emitted from the backlight.

Although the liquid-crystal display device is characterized in that it can be formed more thinly than a CRT, a still thinner liquid-crystal display device has been demanded in recent years. For example, JP-A-2006-100225 (refer to paragraph 0016 and FIG. 1) discloses a technique for forming a thin backlight wherein, when a fluorescent lamp is used as a light source of the backlight, prism patterns are provided in parallel with the fluorescent lamp on a diffuser board that diffuses the light of the fluorescent lamp in order to effectively diffuse the light from the backlight.

FIG. 13A is a diagram showing a light source unit having a backlight according to the conventional technique, when viewed from the front surface side; FIG. 13B, a diagram showing a diffuser board according to the conventional technique; and FIG. 13C, a cross-sectional view taken along the X7-X7 line of FIG. 13A when the diffuser board is provided.

As shown in FIG. 13A, a light source unit 203a includes a plurality of fluorescent lamps 204 laterally arranged as light sources in a housing 203c. When the fluorescent lamps 204 (linear light sources) are thus laterally arranged, the light emitted from the fluorescent lamps 204 becomes laterally uniform but produces vertically striped mura, in which portions of the liquid crystal panel right above the fluorescent lamps 204 are brighter, and portions therebetween are darker. The shorter the distance between the fluorescent lamps 204 and the liquid crystal panel (i.e., the dimmer the backlight), the clearer becomes striped mura on the liquid crystal panel.

Accordingly, as shown in FIGS. 13B and 13C, a diffuser board 203b having prism patterns formed thereon in parallel with the fluorescent lamps 204 is disclosed in JP-A-2006-100225 (refer to paragraph 0016 and FIG. 1) and JP-A-2006-310150 (refer to paragraphs 0014 to 0018 and FIG. 1).

SUMMARY OF THE INVENTION

The techniques disclosed in JP-A-2006-100225 and JP-A-2006-310150 make it possible to diffuse the light vertically in the light source unit 203a and are therefore effective when a linear light source such as a fluorescent lamp is used. However, when a light emitting diode (LED) is used as a light source of the backlight, the vertical mura shown in FIG. 13A can be prevented, but the lateral mura cannot because the LED is a point light source, thus resulting in a problem that striped mura appears on the liquid crystal panel.

Therefore, an object of the present invention is to provide a liquid-crystal display device having a diffuser board that does not produce striped mura on the surface of the liquid crystal panel even if a point light source is used as a light source of the backlight.

In order to achieve this object, the present invention arranges a plurality of point light sources at the back of the liquid crystal panel, provides a diffuser board between the liquid crystal panel and the point light sources, and forms diffusion patterns on the diffuser board according to the positions and number of point light sources.

In accordance with the present invention, even if a point light source is used as a light source of the backlight, it is possible to provide a liquid-crystal display device having a diffuser board that does not produce striped mura on the surface of the liquid crystal panel.

BRIEF DESCRIPTION OF THE DRAWINGS

Other objects and advantages of the invention will become apparent from the following description of embodiments with reference to the accompanying drawings in which:

FIG. 4A is a diagram showing a backlight apparatus; FIG. 4B, a diagram showing a LED module;

DETAILED DESCRIPTION OF THE PREFERRED EMBODIMENTS

The best mode or modes for carrying out the present invention will be explained in detail below with reference to the accompanying drawings as required.

Figure 1:
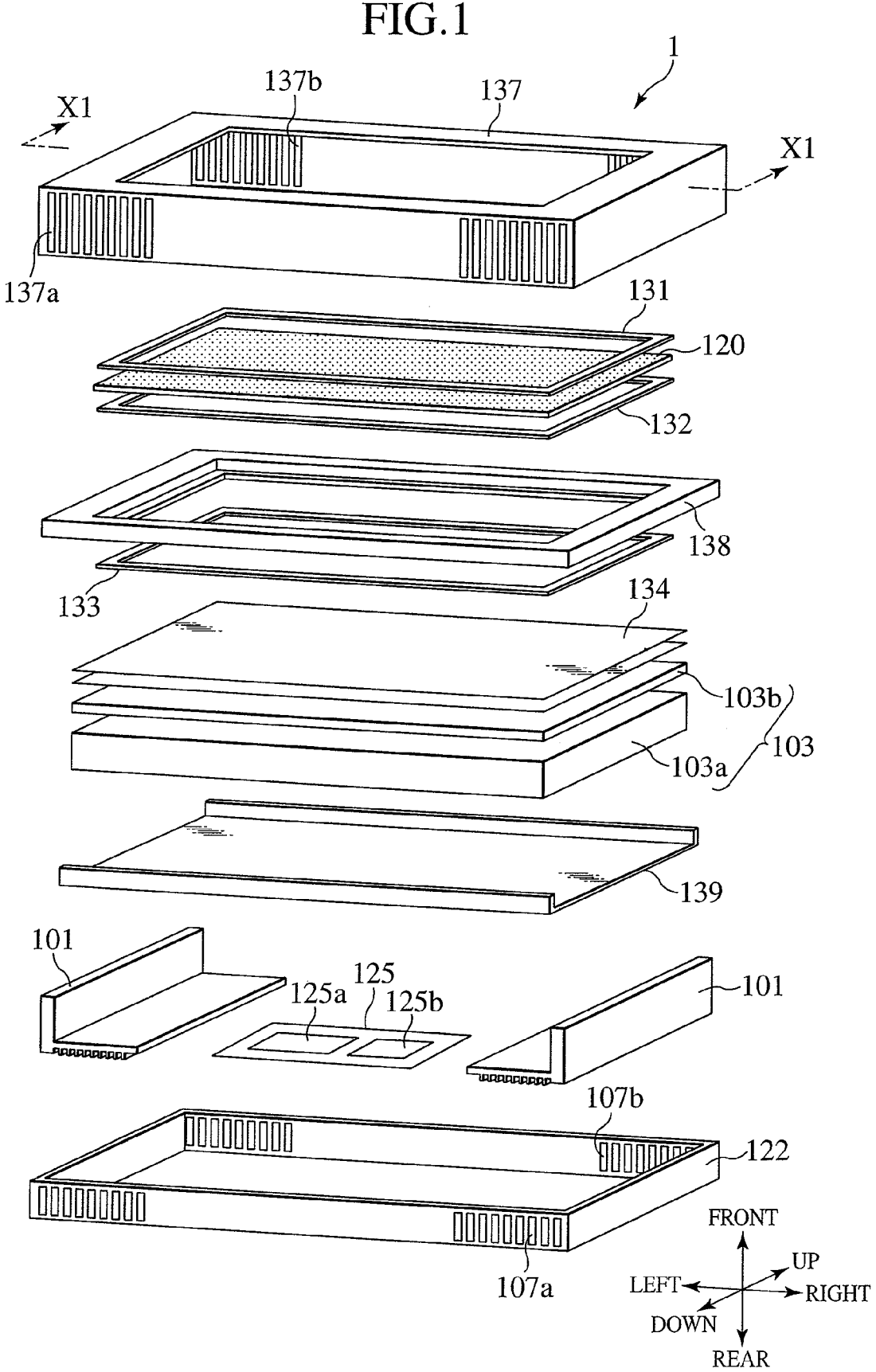
FIG. 1 is a perspective view of the configuration of a liquid-crystal display device according to the present embodiment.
Figure 2:
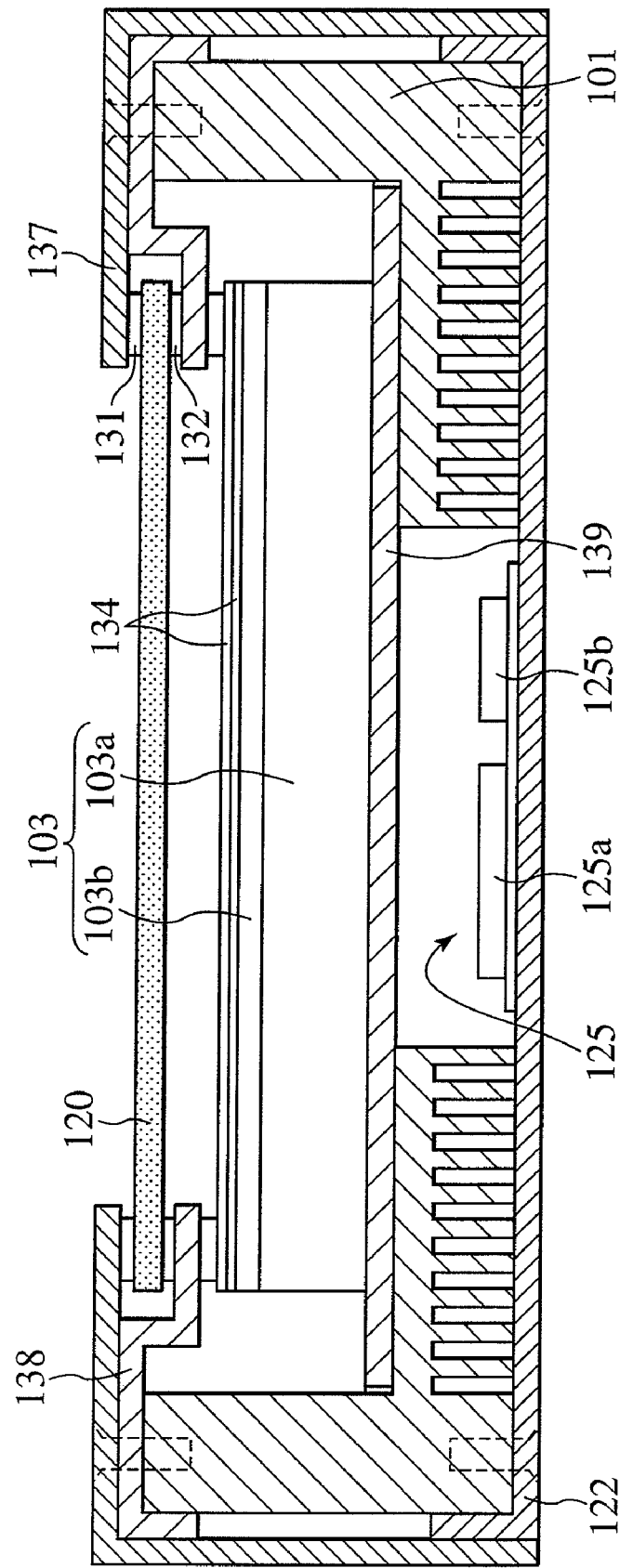
FIG. 2 is a cross-sectional view taken along the X1-X1 line of FIG. 1.
Figure 3A:
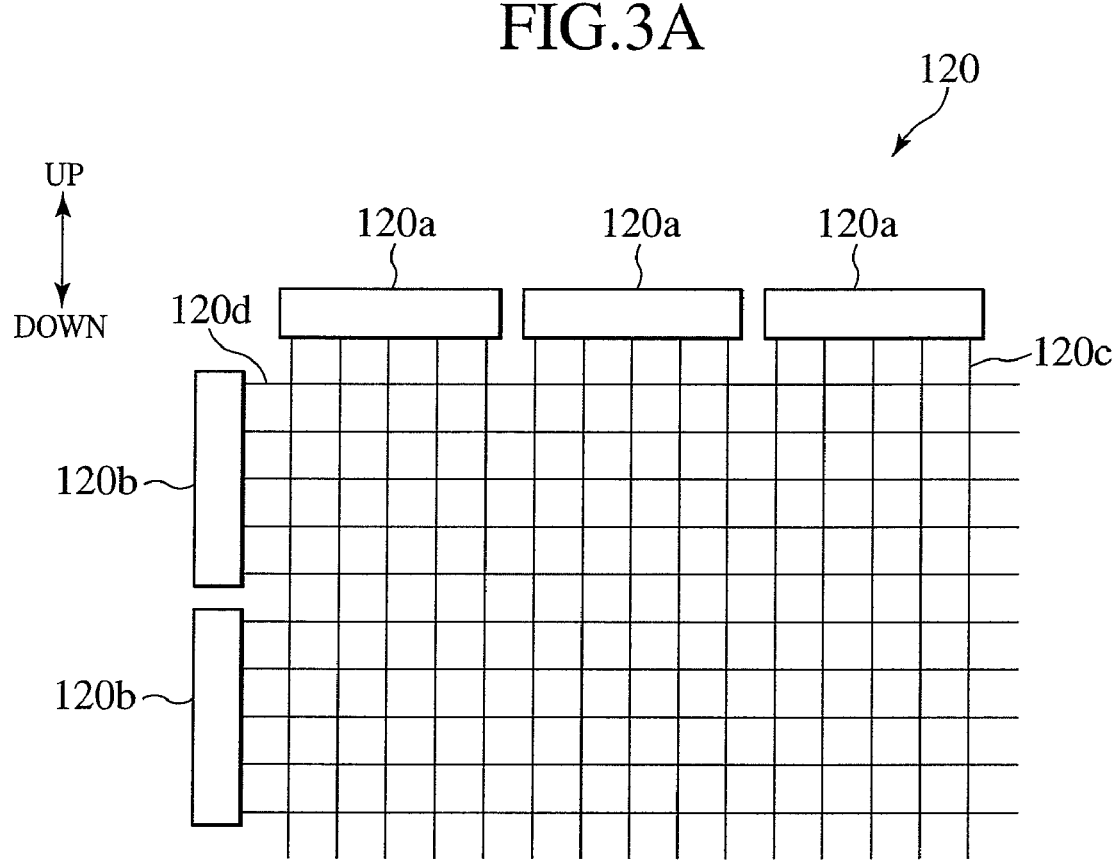
FIG. 3A is a diagram showing arrangements of wiring and drivers of a liquid crystal panel.
Figure 3B:
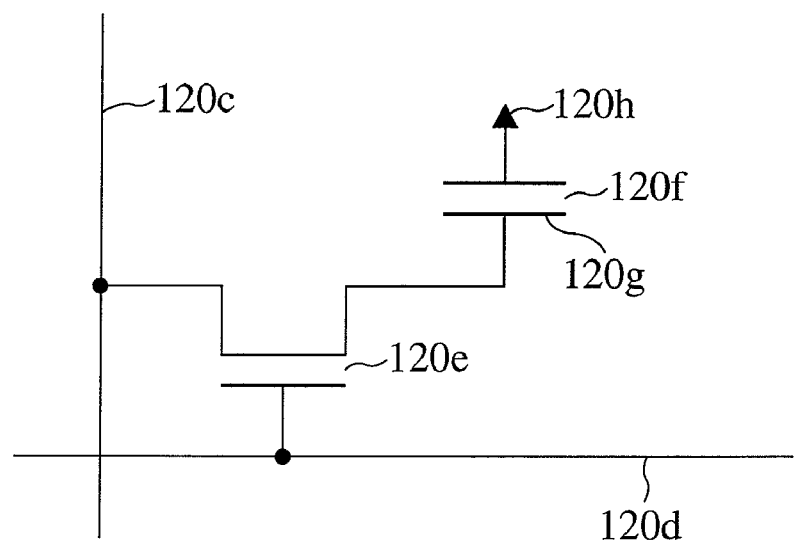
FIG. 3B, a diagram showing arrangements of a Thin Film Transistor (TFT) and a pixel electrode.
Figure 5A:
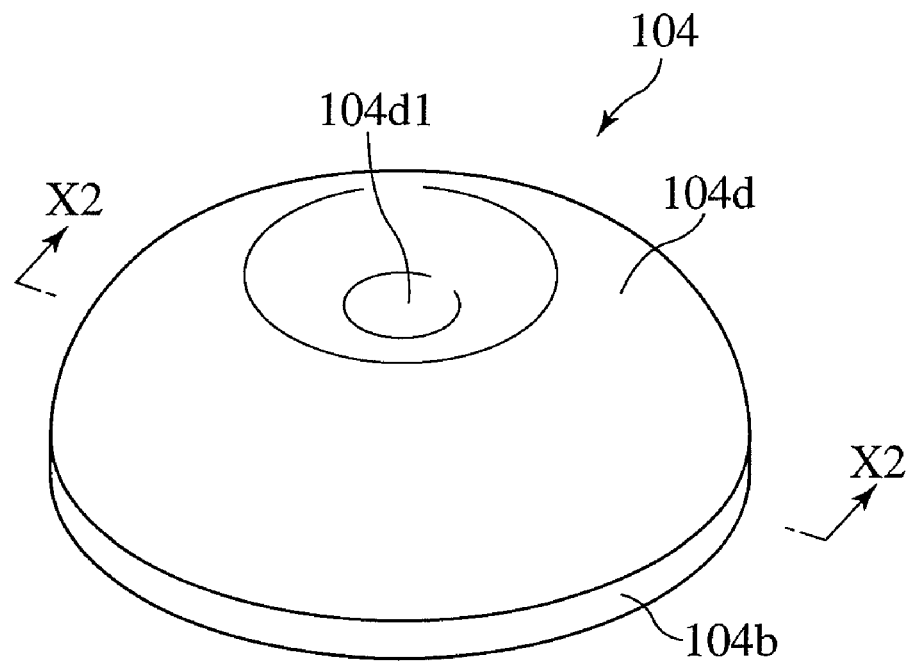
FIG. 5A is a diagram showing the shape of a modified lens.

FIG. 1 is a perspective view of the configuration of a liquid-crystal display device according to the present embodiment; FIG. 2, a cross-sectional view taken along the X1-X1 line of FIG. 1; FIG. 3A, a diagram showing arrangements of wiring and drivers of a liquid crystal panel; FIG. 3B, a diagram showing arrangements of a Thin Film Transistor (TFT) and a pixel electrode; FIG. 4A, a diagram showing a backlight apparatus; FIG. 4B, a diagram showing a LED module; FIG. 5A, a diagram showing the shape of a modified lens; and FIG. 5B, a cross-sectional view taken along the X2-X2 line of FIG. 5A. With the present embodiment, as shown in FIG. 1, the horizontal and vertical directions and the front-back directions are defined with the display screen of a liquid crystal panel 120 as the basis.

As shown in FIG. 1, a liquid-crystal display device 1 according to the present embodiment includes the liquid crystal panel 120, a backlight apparatus 103, a back cover 122, and heatsinks 101. Further, the liquid-crystal display device 1 includes a first frame 137, a first rubber cushion 131, a second rubber cushion 132, a second frame 138, an optical sheet 134, and a third frame 139.

Although the details of the backlight apparatus 103 will be later mentioned, the backlight apparatus 103 includes a light source unit 103a and a diffuser board 103b, is arranged at the back of the liquid crystal panel 120, and thus functions to illuminate the liquid crystal panel 120 from its back surface.

As shown in FIG. 2, a space is provided between the backlight apparatus 103 and the back cover 122, and the heatsinks 101 extend in the space.

The liquid crystal panel 120 includes two glass substrates and a liquid crystal layer sandwiched therebetween. The panel 120 is provided with an optical shutter function to control the transmission and interception of the light outputted from the backlight apparatus 103 by the orientation of liquid crystal molecules that form the liquid crystals being controlled.

As shown in FIG. 3A, the liquid crystal panel 120 includes data lines 120c and gate lines 120d arranged in a reticular pattern. The liquid crystal panel 120 also includes source drivers 120a for driving the data lines 120c and gate drivers 120b for driving the gate lines 120d.

Further, as shown in FIG. 3B, a TFT 120e which drives a liquid crystal 120f is connected to each grid point formed by a data line 120c and a gate line 120d. When a positive voltage is applied to the gate line 120d, the TFT 120e allows conduction between the data line 120c and a pixel electrode 120g. In this case, a voltage associated with image data is applied to the pixel electrode 120g from the data line 120c, and the shutter of the liquid crystal 120f opens or closes (that is, liquid crystal molecules of the liquid crystal 120f are oriented to transmit light therethrough or block the light) in response to the voltage between the pixel electrode 120g and a common electrode 120h. When the shutter of the liquid crystal 120f opens, the light outputted from the backlight apparatus 103 shown in FIG. 1 is transmitted, and the pixel becomes bright. When the shutter of the liquid crystal 120f is not open, the pixel becomes dark.

The relation between the opening/closing state of the shutter of the liquid crystal 120f and the voltage applied to the liquid crystal (nearly equal to the voltage between the pixel electrode 120g and the common electrode 120h) depends on the so-called display mode of the liquid crystal 120f. In the case of the display mode of the liquid crystal panel 120 for a common television receiver, for example, when the absolute value of the voltage applied to the liquid crystal 120f is large (about 5V), the pixel becomes bright; when the absolute value is small (about 0V), the pixel becomes dark. In the case of the voltage range between 0V and 5V, the larger the absolute value of a voltage, the brighter becomes the pixel, albeit in a nonlinear manner. Gray-scale display is made possible by appropriately sectioning the voltage range between 0V and 5V. It goes without saying that the present invention is not limited to the above-mentioned display modes.

Further, when a negative voltage is applied to the gate line 120d connected to the TFT 120e, a high-resistance state arises between the data line 120c and the pixel electrode 120g, and the voltage that has been applied to the liquid crystal 120f is retained.

Thus, the liquid crystal 120f is controlled by the voltage applied to the gate line 120d and the data line 120c.

Each of the gate drivers 120b is provided with a function to scan the gate lines 120d, for example, sequentially from the top downward at fixed intervals so as to apply a predetermined voltage to one of the gate lines 120d. Further, the source driver 120a applies to each data line 120c connected thereto a voltage associated with each pixel connected with a gate line 120d to which the gate driver 120b applies a predetermined voltage.

With this configuration, it is possible to set a pixel to a bright or dark one by means of the gate lines 120d to which voltage is applied. As the gate driver 120b scans the gate lines, the source driver 120a can set pixels to bright or dark ones for all the gate lines 120d by controlling the voltage applied to each data line 120c, thus forming an image on the liquid crystal panel 120.

It is preferable that the source driver 120a and the gate driver 120b be controlled, for example, by a control unit 125a (refer to FIG. 1).

For example, the control unit 125a is provided with a function to manage an image signal to be displayed on the liquid crystal panel 120 as luminance information for each liquid crystal 120f (refer to FIG. 3B). Specifically, it is preferable that the control unit 125a controls the gate driver 120b to scan the gate lines 120d sequentially from the top downward so as to apply a predetermined voltage to one of the gate lines 120d and also that the control unit controls the source driver 120a to apply a predetermined voltage to each data line 120c connected thereto in response to the luminance information of the data line 120c that is connected with the TFT 120e connected with the gate line 120d to which a predetermined voltage is applied.

Referring to FIG. 1 again, the backlight apparatus 103 arranged at the back of the liquid crystal panel 120 illuminates the liquid crystal panel 120 from its back side.

As shown in FIG. 4A, the backlight apparatus 103 has the following structure: the light source unit 103a is constructed by a plurality of LED modules 104 being arranged regularly in a housing 103 having an open surface on its front side, for example, so as to form grid points vertically and laterally, and the diffuser board 103b is fixed so as to cover the open surface of the housing 103c.

The housing 103c is a shallow box-shaped member having an open surface on the front surface side, and the plurality of LED modules 104 are arranged at the bottom (on the back surface) inside the open surface. The material of the housing 103c is not limited. For example, it may be formed of plastic or a processed plate metal. In order to effectively irradiate the front surface side with the light emitted by the LED modules 104, it is preferable that a well-reflecting reflective surface be formed inside the housing 103c. Possible methods of forming a reflective surface inside the housing 103c include, for example, depositing a metal film, painting the inside of the housing white or silver, sticking a white or silver sheet, etc.

The diffuser board 103b composed of a transparent plastic, such as acrylics, transmits, reflects, and diffuses the light emitted by the LED modules 104.

As shown in FIG. 4B, each of the LED modules 104 has the following structure: a plurality of LEDs 104a (for example, three colors (R, G, and B)) are fixed on a substrate 104b and electrically connected with wiring patterns 104c formed on the substrate 104b through bonding, etc. Further, a lens 104d for moderately diffusing the emitted light covers the light-emitting surfaces of the LEDs 104a. A current or voltage is supplied to the LEDs 104a through the wiring patterns 104c to allow the LEDs 104a to emit light.

The lens 104d has an approximately spherical shape and is provided with a function to refract the light emitted from the light-emitting surfaces 104a1 of the LEDs 104a to diffuse it therearound. However, the shape of the lens 104d is not limited to a sphere and may be a spheroid.

Figure 5B:
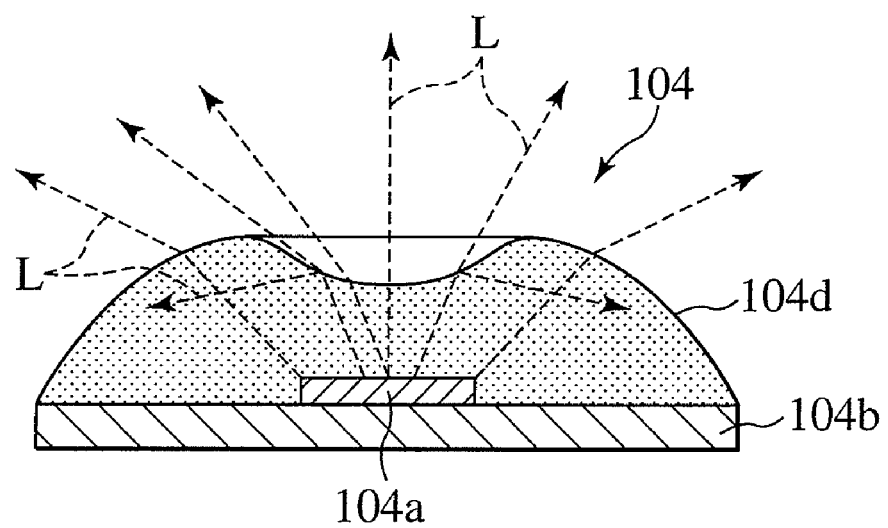
FIG. 5B, a cross-sectional view taken along the X2-X2 line of FIG. 5A.

Further, as shown in FIGS. 5A and 5B, the lens 104d may have a concave potion 104d1 at the top thereof.

When the concave portion 104d1 is provided at the top of the lens 104d, the light beams L emitted by the LED 104a are refracted in a wide angle at the boundary between the lens 104d and air and diffused around the LED 104a, as shown by arrows in FIG. 5B. Also, since a part of the light beams L heading toward the concave portion is reflected toward the inside of the lens 104d by the concave portion 104d1, a phenomena can be prevented that the top of the lens 104d becomes brighter than the periphery thereof, thus resulting in improved light distribution characteristics.

In the light source unit 103a, each of the LED modules 104 as shown in FIG. 4B or 5A is arranged, for example, at a grid point on the bottom of the housing 103c with the light-emitting surface 104a1 oriented toward the open side. Although the arrangement intervals of the LED modules 104 are not limited, it is preferable that the intervals be set in consideration of the light-emitting capability thereof and the liquid crystal panel 120 (refer to FIG. 1). They are set to 40 to 45 mm with the present embodiment.

Referring to FIG. 1 again, the back cover 122 is made of plastic and functions as a protection cover for the back surface of the liquid-crystal display device 1. Intake openings 107a for absorbing air are provided at the bottom surface of the back cover 122, and exhaust openings 107b for discharging air at the top surface thereof.

The first frame 137 is made of plastic and arranged at the front surface of the liquid crystal panel 120 to function as a front cover of the liquid-crystal display device 1. Further, the first frame 137 has an opening at the display area of the liquid-crystal display device 1. Intake openings 137a for absorbing air are provided at the bottom surface of the first frame 137, and exhaust openings 137b for discharging air at the top surface thereof.

When the first frame 137 and the back cover 122 are combined to form the liquid-crystal display device 1, the exhaust openings 137b of the first frame 137 communicate with the exhaust openings 107b of the back cover 122, and the intake openings 137a of the first frame 137 communicate with the intake openings 107a of the back cover 122.

The first rubber cushion 131 is provided on the front surface of the liquid crystal panel 120 to function as a support member between the first frame 137 and the liquid crystal panel 120. A second rubber cushion 132 is provided at the back of the liquid crystal panel 120 to function as a buffer material between the liquid crystal panel 120 and the second frame 138.

The second frame 138 supports the liquid crystal panel 120. Also, it is arranged between the heatsinks 101 and the liquid crystal panel 120 to function as a heat insulation material that prevents heat conduction from the heatsinks 101 to the liquid crystal panel 120.

The optical sheet 134 is arranged at the back of the second frame 138 and has a function to give directivity to light emitted from the back light apparatus 103 so as to achieve further planar uniformity of the light or improve the front-directional luminance. The number of optical sheets 134 is not limited. Two optical sheets 134 are shown in FIG. 1.

Each of the heatsinks 101 is connected with the backlight apparatus 103 through a third frame 139. The heat generated in the backlight apparatus 103 is conducted to the heatsinks 101 for radiation. The heatsinks 101 made of a metal material having excellent thermal conductivity, such as copper, aluminum, etc. are provided in order to efficiently release the heat generated in the backlight apparatus 103. Further, the liquid crystal panel 120 and the backlight apparatus 103 are contained in a virtual rectangular parallelepiped area externally in contact with the heatsinks 101. Thus, the heatsinks 101 are also provided with a function to protect the liquid crystal panel 120 and the backlight apparatus 103 when a load is applied to the liquid-crystal display device 1.

Here, each of the heatsinks 101 has an approximately L-shaped structure when viewed from the top, and the bent portion thereof is arranged between the backlight apparatus 103 and the back cover 122 as shown in FIG. 2. Then, a space ranging from the bottom end of the liquid crystal panel 120 to the top end thereof is formed around each of the heatsinks 101 arranged between the backlight apparatus 103 and the back cover 122.

The heat generated in the backlight apparatus 103 is conducted to the heatsinks 101, diffused in the planar direction on the heatsinks 101 located at the back of the backlight apparatus 103, and then released into the air flowing between the backlight apparatus 103 and the back cover 122. The air flowing between the backlight apparatus 103 and the back cover 122 moves from the bottom upward because of natural convection.

Then, the ambient air is absorbed by the liquid-crystal display device 1 through the intake openings 137a (refer to FIG. 1) provided on the first frame 137 and the intake openings 107a (refer to FIG. 1) provided on the back cover 122, and then exhausted through the exhaust openings 137b (refer to FIG. 1) provided on the first frame 137 and the exhaust openings 107b (refer to FIG. 1) provided on the back cover 122.

Thus, as shown in FIG. 2, the present embodiment is provided, between the backlight apparatus 103 and the back cover 122, with a clearance for releasing the heat vertically with respect to the display screen of the liquid crystal panel 120, i.e., a ventilation path. The heatsinks 101 arranged in the ventilation path are cooled by the air flowing from the intake openings 137a (refer to FIG. 1) provided on the first frame 137 and the intake openings 107a (refer to FIG. 1) provided on the back cover 122 to the exhaust openings 137b (refer to FIG. 1) provided on the first frame 137 and the exhaust openings 107b (refer to FIG. 1) provided on the back cover 122 into the ventilation path because of natural convection.

Further, as shown in FIG. 1, there is provided a drive unit 125 which includes the control unit 125a for controlling the liquid-crystal display device 1 and also a DC/DC power supply 125b for supplying power voltage to the backlight apparatus 103, etc. The control unit 125a controls the liquid crystal panel 120, the backlight apparatus 103, etc. and processes an image displayed on the liquid-crystal display device 1. Although not shown in FIG. 1, the control unit 125a is composed of, for example, a computer including a CPU (Central Processing Unit), RAM (Random Access Memory), ROM (Read Only Memory), etc., a program, peripheral circuits, etc. and driven by a program stored in the ROM.

The thus-formed liquid-crystal display device 1 (refer to FIG. 1) is characterized in that it is provided with the diffuser board 103b (refer to FIG. 1) which uniformly diffuses the light emitted by the LED modules 104 (refer to FIG. 4A) of the backlight apparatus 103.

Figure 6A:
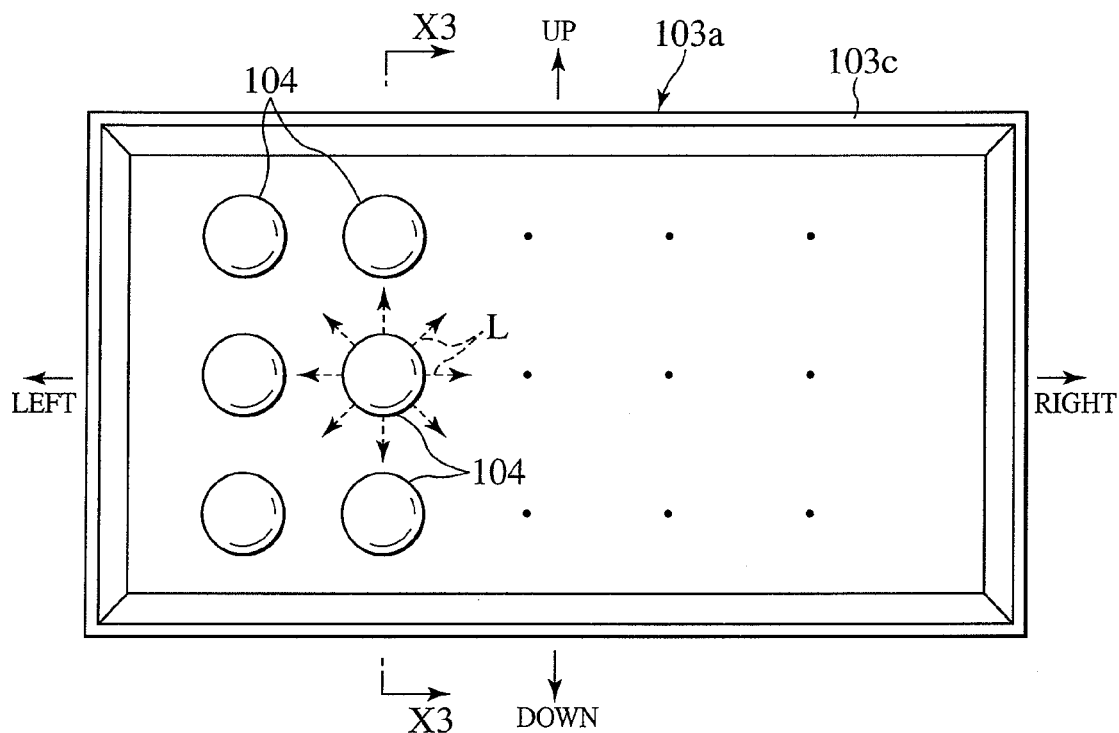
FIG. 6A is a diagram showing a light source unit, when viewed from the front surface side.
Figure 6B:
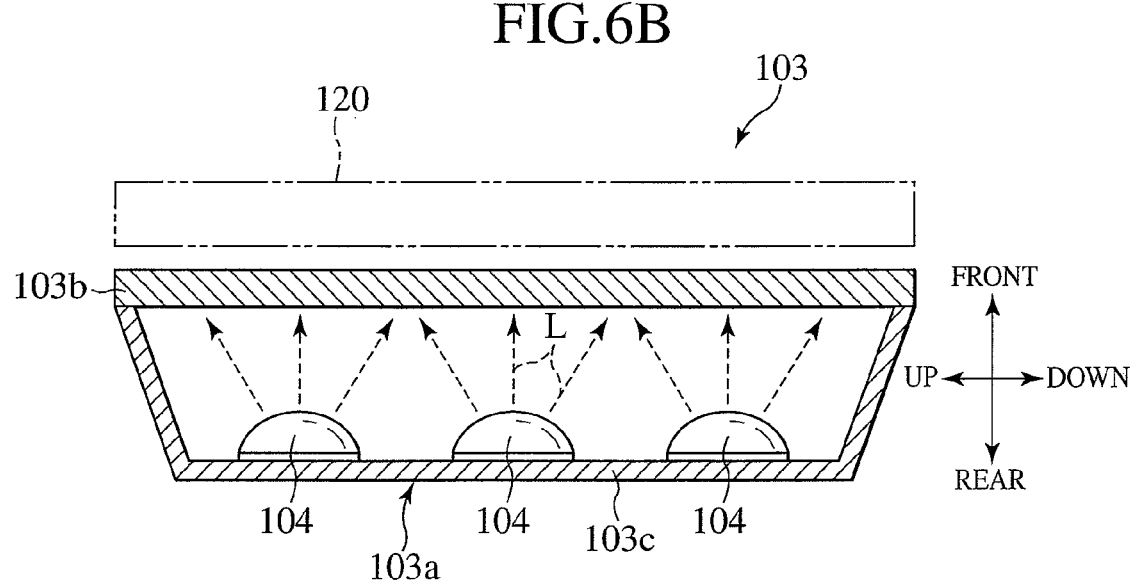
FIG. 6B, a cross-sectional view taken along the X3-X3 line of FIG. 6A in a state where a diffuser board without diffusion patterns is provided.

FIG. 6A is a diagram showing the light source unit, when viewed from the front surface side; and FIG. 6B, a cross-sectional view taken along the X3-X3 line of FIG. 6A, showing a state where a diffuser board without diffusion patterns is provided. Although three rows of LED modules 104 are arranged in FIG. 6A to simplify explanation, this number is not limited thereto.

As shown in FIGS. 6A and 6B, the light L beams are emitted from each of the LED modules 104 so as to be diffused therearound.

Here, if the light source unit 103a is thinly configured, the distance between the LED modules 104 and the liquid crystal panel 120 arranged on the front surface of the light source unit 103 becomes short, as shown in FIG. 6B. In this case, when a diffuser board 103b having a flat surface without diffusion patterns is used, the light beams L reach the liquid crystal panel 120, without being sufficiently diffused. Accordingly, this causes an area where the light L beams do not reach the liquid crystal panel 120, and therefore mura will occur on the liquid crystal panel 120.

Figure 7A:
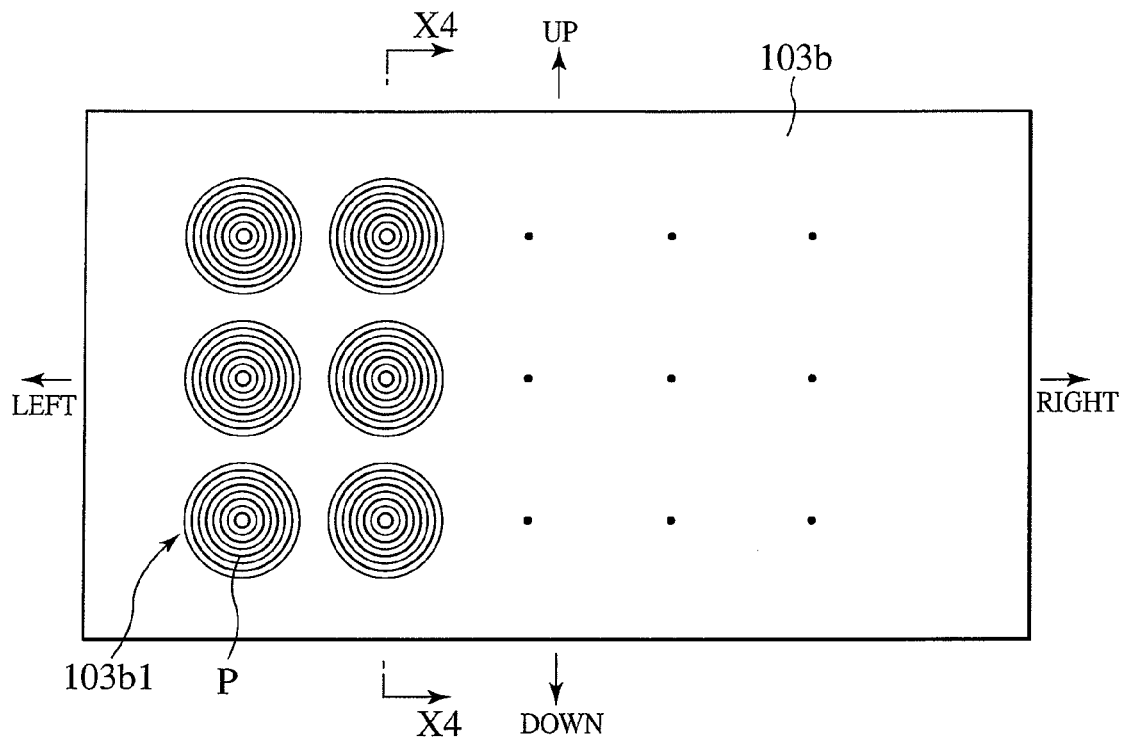
FIG. 7A is a diagram showing a diffuser board.
Figure 7B:
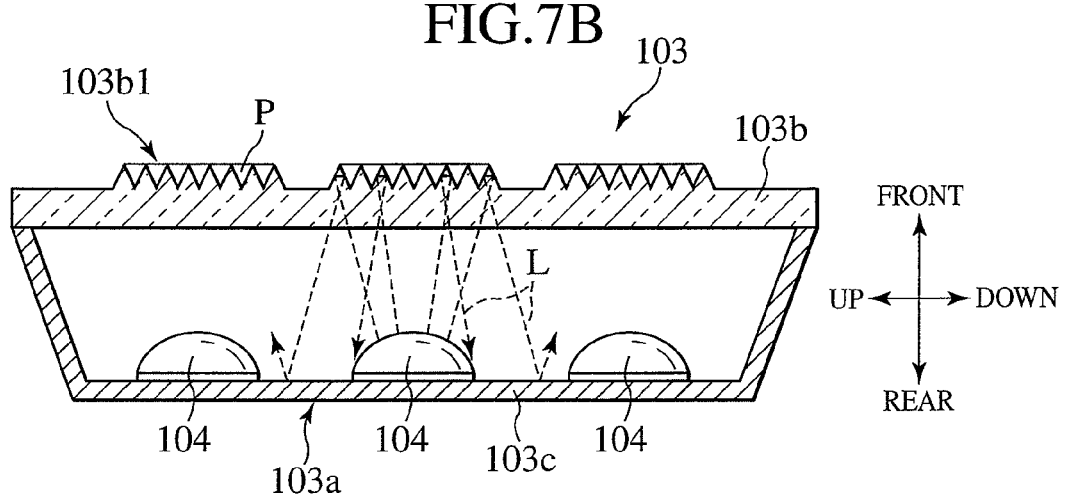
FIG. 7B, a cross-sectional view taken along the X4-X4 line of FIG. 7A in a state where the diffuser board is attached to the light source unit.

For this reason, a diffuser board 103b having diffusion patterns is arranged between the light source unit 103a and the liquid crystal panel 120 so as to efficiently diffuse the light beams L and prevent mura on the liquid crystal panel 120. FIG. 7A is a diagram showing a diffuser board; FIG. 7B, a cross-sectional view taken along the X4-X4 line of FIG. 7A in a state where the diffuser board is attached to the light source unit; and FIG. 7C, a diagram showing a reflection state of the light beams by prism patterns.

As shown in FIG. 7A, diffusion portions 103b1 are formed on the surface of the diffuser board 103b, each of which is composed of concentrically-formed prism patterns P (diffusion patterns). Each of the diffusion portions 103b1 has a structure in which a prism pattern P that is formed by the surface of the diffusion board 103b being convexed to have, for example, a generally isosceles-triangular cross-section is continuously arranged such that the apex of the prism pattern P forms a circle when viewed from the front side.

The cross-section of the prism pattern P is, for example, an approximately isosceles triangle having an apex angle of 90 to 110 degrees as shown in FIG. 7B. Further, the height of the prism pattern P is not limited to a certain value. Preferably, it may be set to 200 μm or less because of ease of processing. Such prism patterns P are concentrically arranged at intervals of, for example, 20 to 700 μm to form a diffusion portion 103b1. Then, as shown in FIG. 7B, the diffuser board 103b is arranged on the front surface side of the light source unit 103a so that the central portion of a diffusion portion 103b1 is located right in front of the front surface of a LED module 104 included in the light source unit 103a. Specifically, with the present embodiment, as many diffusion portions 103b1 as the LED modules 104 (point light sources) are formed and arranged at positions corresponding to the point light sources. With this arrangement of the diffusion portions 103b1, the diffusion portions 103b1 are formed according to the number of the LED modules 104 (point light sources) and arranged according to the positions thereof.

Although FIGS. 7A and 7B show diffusion portions 103b1 each having four prism patterns P for simplification, the number of prism patterns P is not limited thereto. Preferably, it may be set, for example, according to the arrangement intervals of the LED modules 104, etc.

Further, although FIG. 7A shows that there is a flat surface between the diffusion portions 103b1, it is also possible, for example, to arrange additional prism patterns P on the outer side of each diffusion portion 103b1 so that the additional diffusion patterns concentrically formed with the prism patterns P are arranged between the diffusion portions 103b1.

Thus, a diffusion portion 103b1 is composed of concentrically-formed prism patterns P and arranged so that the center thereof is located right in front of the front surface of a LED module 104. With this configuration, as shown by arrows in FIG. 7B, some of the light beams L emitted from the LED module 104 are reflected by the diffusion portion 103b1 toward the housing 103c, and the others (not shown) penetrate the diffuser board 103b. The light beams L reflected by the diffusion portion 103b1 are reflected by a reflection surface formed inside the housing 103c toward its open surface and then exit the light source unit 103a. Some of the light beams L penetrate the diffuser board 103b, and the others are reflected again by the diffusion portion 103b1. This configuration makes it possible to diffuse the light beams L emitted from the LED module 104.

Figure 7C:
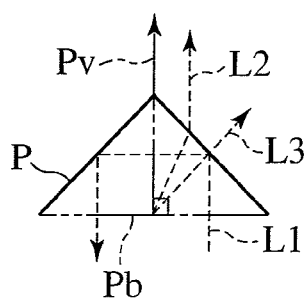
FIG. 7C, a diagram showing a reflection state of the light beams by a prism pattern.

As shown particularly in FIG. 7C, when the direction perpendicular to a prism bottom face Pb is taken as prism normal line Pv, the better part of incident light beams L1 in parallel with the prism normal line Pv returns to the housing 103c because of total reflection. On the other hand, the better part of the light beams L incident at an angle of 10 degrees (light beam L2 shown in FIG. 7C) to 45 degrees (light beam L3 shown in FIG. 7C) with respect to the prism normal line Pv penetrates the prism pattern. Since the most part of the light beams L incident on the prism pattern P right above the LED module 104 is approximately in parallel with the prism normal line Pv, the light beams L emitted upward from the LED module 104 is reflected by the prism pattern P. Further, most part of the light beams L incident on a portion between the LED modules 104 penetrates the diffuser board 103b because the incident light beams L are inclined by a certain angle (10 to 45 degrees) with respect to the prism normal line Pv. Therefore, with the backlight apparatus 103, increased luminance is restrained at portions right above the LED modules 104, and decreased luminance is restrained at portions between the LED modules 104.

Further, with the present embodiment, since a diffusion portion 103b1 is circularly formed, the light beams L emitted from the LED module 104 are diffused by the diffusion portion 103b1 in a circumferentially uniform manner with the LED module 104 as a center.

Therefore, even if point light sources like the LED modules 104 are used, the light outputted from the backlight apparatus 103 penetrates the diffuser board 103b to become uniform illuminating light, producing an outstanding effect, i.e., prevention of mura.

OTHER EMBODIMENTS

As mentioned above, with the present embodiment, the diffusion portions 103b1 (refer to FIG. 7A) each having concentrically-formed prism patterns P are formed on the diffuser board 103b (refer to FIG. 7A). In the present invention, various design changes can be made without departing from the scope and spirit thereof.

For example, it is also possible to form micro lenses having various shapes on the surface of the diffuser board and form diffusion portions in combination of the micro lenses and prism patterns to diffuse the light emitted by the LED modules 104 (refer to FIG. 4A). FIGS. 8, 9, and 10 are diagrams showing example diffusion portions formed on the diffuser board.

Here, a micro lens is a minute, convex-shaped portion formed on the surface of the diffuser board through, for example, a droplet discharge method, extrusion molding, mold injection, etc.

Figure 8A:
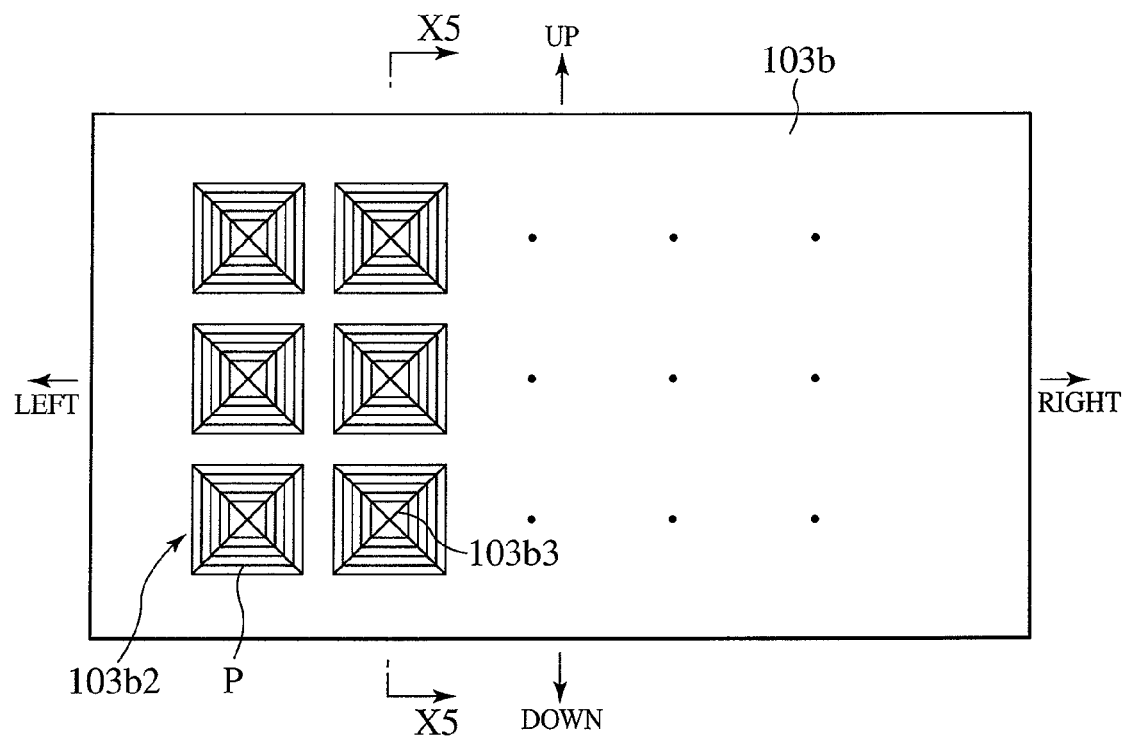
FIG. 8A is a front-view showing a diffuser board having diffusion portions in which prism patterns are formed so as to surround a quadrangular-pyramid-shaped micro lens having a square-shaped bottom face.
Figure 8B:
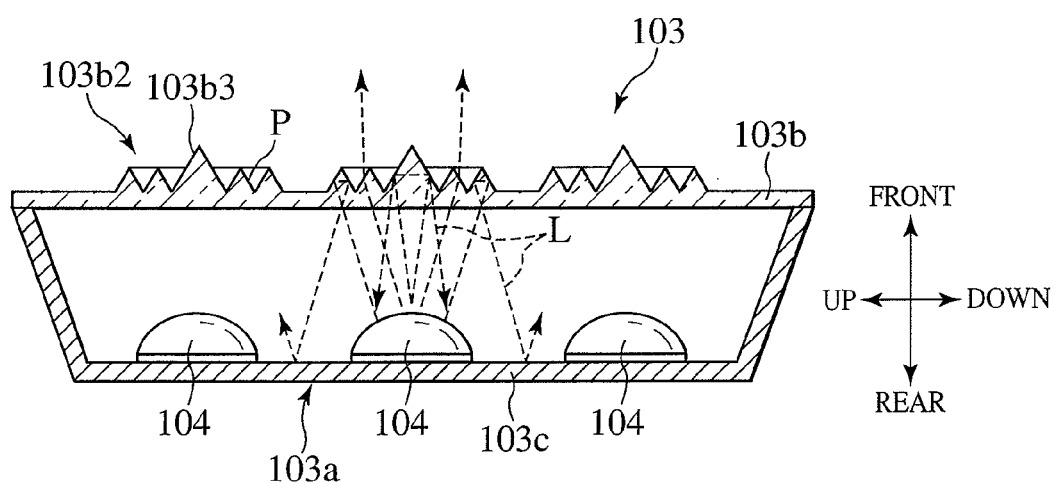
FIG. 8B, a cross-sectional view taken along the X5-X5 line of FIG. 8A.

FIG. 8A is a front-view showing a diffuser board having diffusion portions in which prism patterns are formed so as to surround a quadrangular-pyramid-shaped micro lens having an approximately square-shaped bottom face; and FIG. 8B, a cross-sectional view taken along the X5-X5 line of FIG. 8A.

Figure 9A:
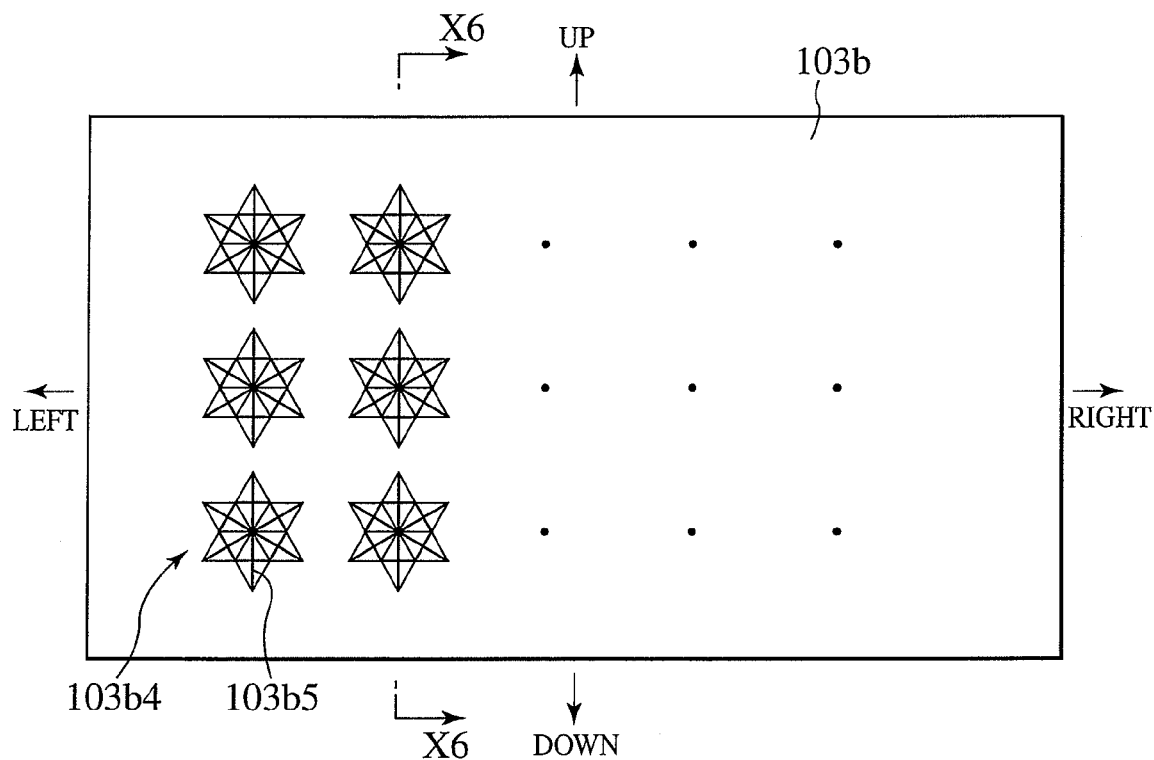
FIG. 9A is a front-view showing a diffuser board having diffusion portions in which quadrangular-pyramid-shaped micro lenses each having a rhomboid-shaped bottom face are arranged so that the bases thereof come in contact with each other.
Figure 9B:
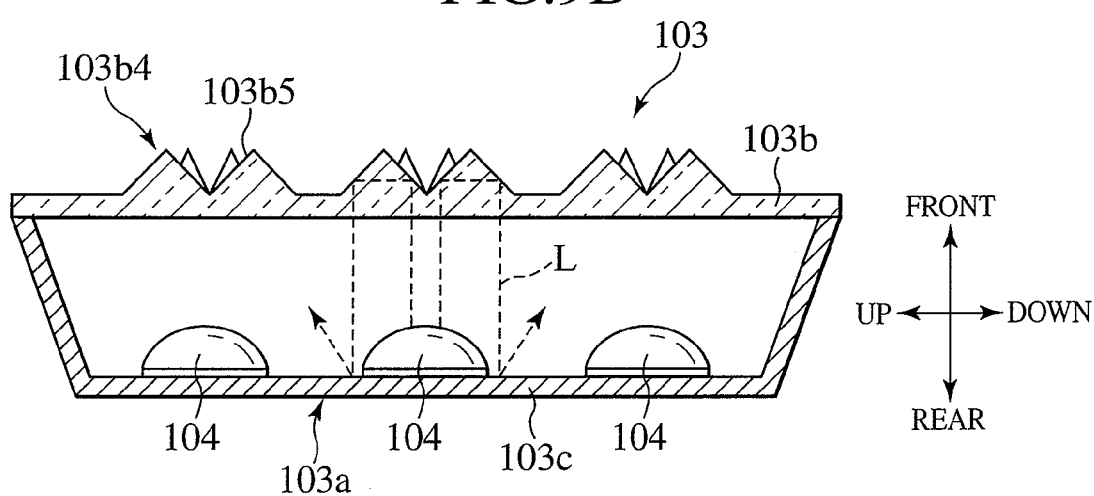
FIG. 9B, a cross-sectional view taken along the X6-X6 line of FIG. 9A.
Figure 10:
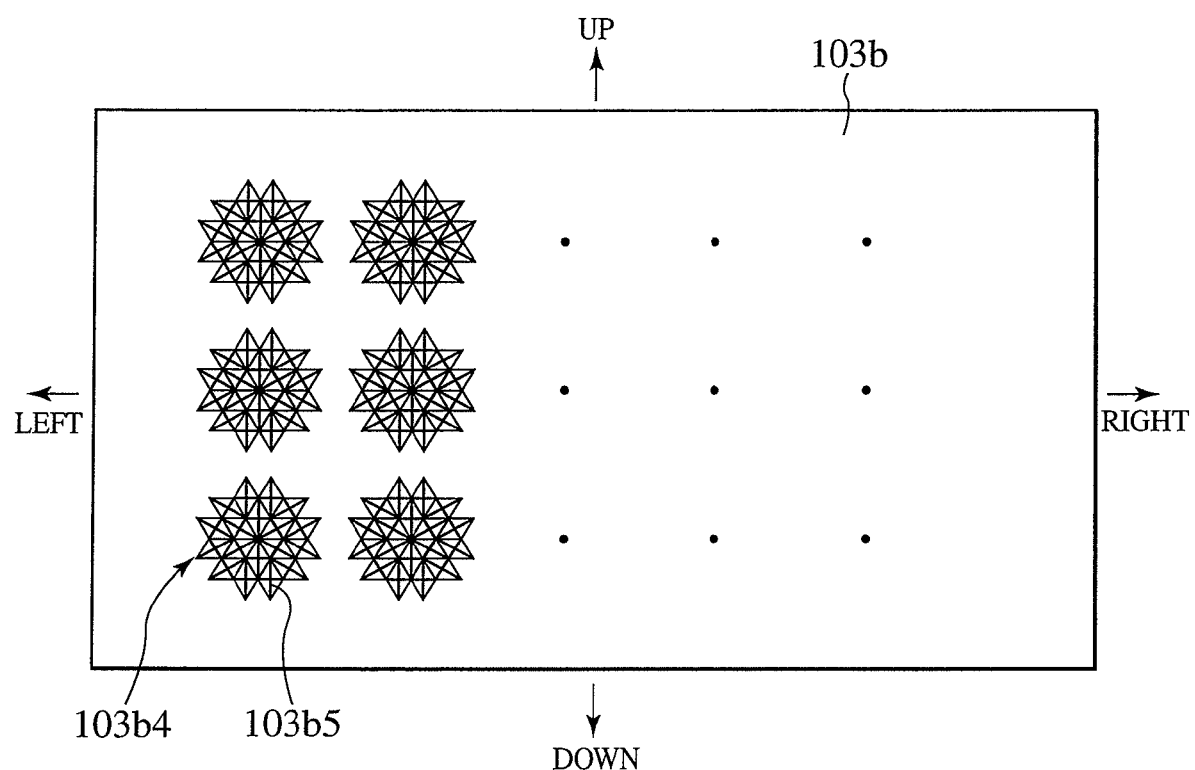
FIG. 10 is a diagram showing a state where micro lenses are formed around each of the diffusion portions of FIG. 9A.

FIG. 9A is a front-view showing a diffuser board having diffusion portions in which quadrangular-pyramid-shaped micro lenses each having an approximately rhomboid-shaped bottom face are arranged so that the bases thereof come in contact with each other; and FIG. 9B, a cross-sectional view taken along the X6-X6 line of FIG. 9A.

Further, FIG. 10 is a diagram showing a state where micro lenses are formed around each of the diffusion portions of FIG. 9A.

As shown in FIG. 8A, a quadrangular-pyramid-shaped micro lens 103b3 having an approximately square-shaped bottom face is arranged at the central portion of each diffusion portion 103b2, and rectangular prism patterns P having an approximately isosceles-triangular cross-section are formed around the micro lens 103b3. That is, each of the prism patterns P is formed such that the apex thereof forms a rectangle that surrounds the micro lens 103b3. As shown in FIG. 8B, when the diffuser board 103b is fixed to the light source unit 103a, each of the micro lenses 103b3 is located right in front of the front surface of each of the LED modules 104.

With the diffuser board 103b having the thus-shaped diffusion portions 103b2 formed thereon, as shown in FIG. 8B, some of the light beams L emitted by a LED module 104 penetrate the diffuser board 103b, and the others are reflected by the micro lens 103b3 and the surrounding prism patterns P.

Then, the light beams L reflected by the micro lens 103b3 and the surrounding prism patterns P are reflected again by a reflective surface formed inside the housing 103c and then emitted from the backlight apparatus 103.

Thus, when the diffusion portions 103b2 are formed with the quadrangular-pyramid-shaped micro lens 103b3 and the prism patterns P therearound, even if point light sources like the LED modules 104 are used, the light beams L emitted by the LED modules 104 are suitably diffused by the diffusion portions 103b2, and the light outputted from the backlight apparatus 103 becomes uniform, making it possible to prevent mura. Although FIGS. 8A and 8B show the configuration wherein only one quadrangular-pyramid-shaped micro lens 103b3 is formed at the central portion, the configuration is not limited thereto, and a plurality of micro lenses 103b3 may be formed near the central portion.

Also in this case, each of the prism patterns P is formed as a raised portion having an approximately isosceles-triangular cross-section and an apex angle of 90 to 110 degrees. Preferably, the height of the prism pattern P is set to 200 μm or less because of ease of processing. Preferably, such prism patterns P are concentrically arranged around the micro lens 103b3 at intervals of, for example, 20 to 700 μm so that the apex of each forms a rectangle when viewed from the front side. Further, preferably, the height of the micro lens 103b3 may also be set to 200 μm or less.

Further, as shown in FIG. 9A, a diffusion portion 103b4 may be formed by arranging six quadrangular-pyramid-shaped micro lenses 103b5 each having an approximately rhomboid-shaped bottom face adjacently to each other so that the apexes of the six micro lenses 103b5 are arranged on the circumference of a circle. In this case, the center of the circle coincides with that of the diffusion portion 103b4.

The number of micro lenses 103b5 forming the diffusion portion 103b4 is not limited to six.

With the diffuser board 103b having the thus-shaped diffusion portions 103b4 formed thereon, as shown in FIG. 9B, some of the light beams L (not shown) emitted by a LED module 104 penetrate the diffuser board 103b, and the others are reflected by the micro lenses 103b5.

Then, the light beams L reflected by the micro lenses 103b5 are reflected again by a reflective surface formed inside the housing 103c and then emitted from the backlight apparatus 103.

Thus, when the diffusion portion 103b4 is formed by circularly arranging the quadrangular-pyramid-shaped micro lenses 103b5, even if point light sources like the LED modules 104 are used, the light L emitted by the LED modules 104 is suitably diffused by the diffusion portions 103b4, and the light outputted from the backlight apparatus 103 becomes uniform, making it possible to prevent mura.

Referring to FIG. 9A, the apexes of the plurality of (six) micro lenses 103b5 are arranged on the circumference of a circle. When the diffuser board 103b is arranged so as to cover the open surface of the housing 103c as shown in FIG. 9B, the center of the circle is located right above that of the lens 104d (refer to FIG. 4B) provided on the LED module 104. It goes without saying that the effect of diffusion can be obtained even if the center of the circle does not exactly coincide with that of the lens 104d, for example, even if both centers are shifted by 1 cm to 2 cm.

In other words, the apexes of the micro lenses 103b5 are arranged so as to surround a predetermined point (the center of the circle) on the diffuser board 103b. When the surface of diffuser board 103b is viewed from the normal line, the micro lenses 103b5 are arranged such that the apexes thereof surround the center of the lens 104d provided on the LED module 104.

Further, although the apexes of the micro lenses 103b5 are arranged on the circumference of a circle as shown in FIG. 9A, the arrangement is not limited thereto, and it is possible to arrange them, for example, rectangularly as long as the apexes are arranged so as to surround a predetermined point (for example, a point right above the center of the lens 104d provided on the LED module 104).

In addition, although not shown, the shape of each micro lens formed on the surface of the diffuser board 103b may possibly be a polygonal pyramid such as a hexagonal pyramid, an octagonal pyramid, etc., and a circular cone.

Further, at the diffusion portion 103b1 where the prism patterns P are concentrically arranged as shown in FIG. 7A, the farther a prism pattern P is from the center of the diffusion portion 103b1, the wider or narrower the interval between prism patterns P can be made. Further, the shape of the prism pattern may be an ellipse instead of a perfect circle.

Further, as shown in FIG. 10, quadrangular-pyramid-shaped micro lenses 103b5 may be formed on the outer side of each of the diffusion portions 103b4 shown in FIG. 9A. The shapes of the micro lenses 103b5 may differ between a position near the center of the diffusion portion 103b4 and a position distant from the center.

For example, in FIG. 10, the apex angle of the micro lens 103b5 arranged on the outer side of the diffusion portion 103b4 may be larger or smaller than that of the micro lens 103b5 arranged on the inner side of the diffusion portion 103b4. The micro lenses 103b5 arranged on the outer side of the diffusion portion 103b4 have the same shape, and the micro lenses 103b5 arranged on the inner side of the diffusion portion 103b4 also have the same shape.

In other words, the diffusion portion 103b4 is formed by arranging the micro lenses 103b5 around a position corresponding to the position of the LED module 104 (refer to FIG. 9B) which is a point light source. Further, micro lenses 103b5 at positions near the center of the diffusion portion 103b4 differ in shape from those at positions distant from the center, and micro lenses 103b5 at positions equidistant from the center have almost the same shape. The micro lenses 103b5 only need to have almost the same shape, and strict design accuracy is not required.

The thus-formed diffusion portion 103b4 makes it possible, for example, to increase the quantity of light to be reflected at the center thereof and increase the quantity of light to be transmitted at a position distant from the center.

Although FIG. 10 shows micro lenses 103b5 doubly formed from the center of the diffusion portion 103b4, its configuration is not limited thereto. The micro lenses 103b5 may be formed triply or more and may further be formed over the entire surface of the diffuser board 103b.

Figure 11A:
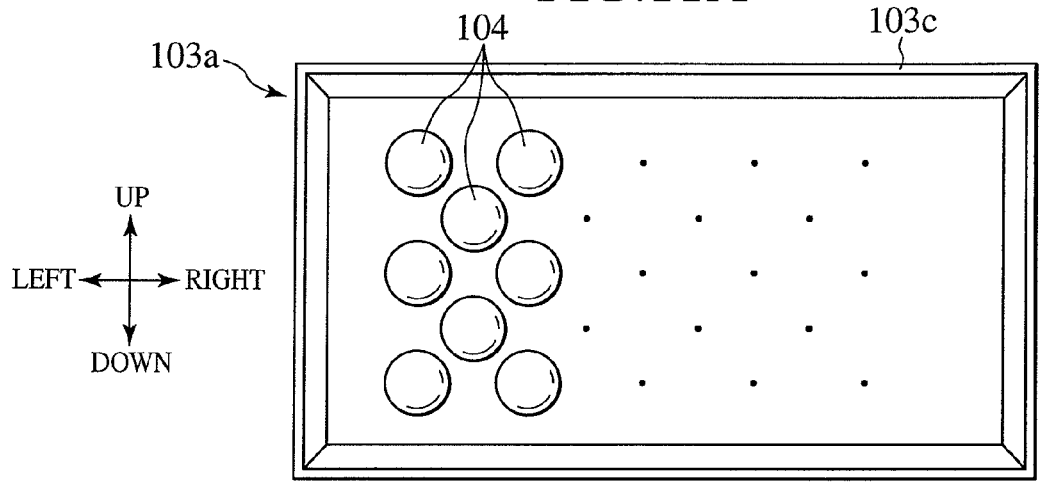
FIG. 11A is a diagram showing arrangements of LED modules.
Figure 11B:
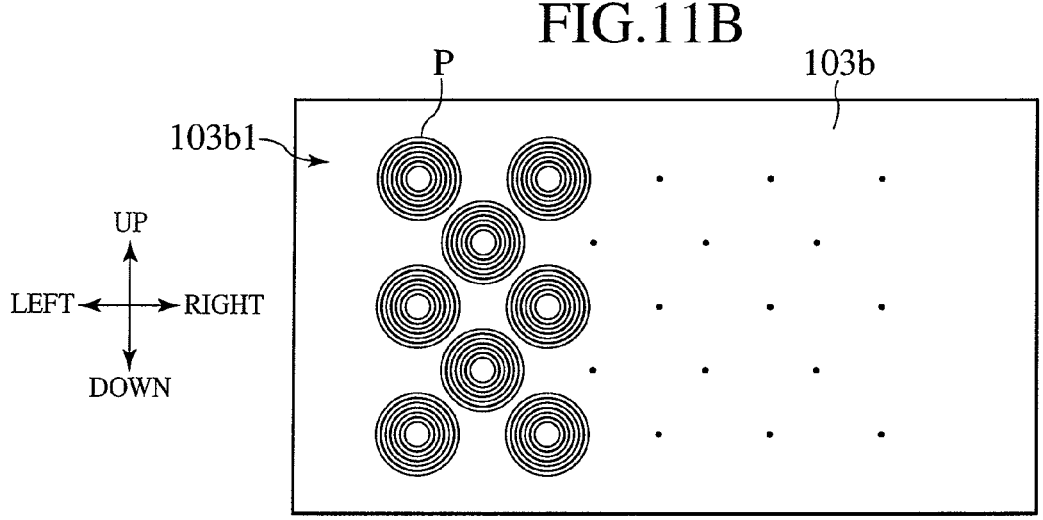
FIG. 11B, a diagram showing diffusion portions in which prism patterns are concentrically arranged when viewed from the front surface side of the diffuser board.

Further, as shown in FIG. 11A, for example, the light source unit 103a may be configured such that LED modules 104 are arranged in an oblique direction from the LED modules 104 arranged at grid points. FIG. 11A is a diagram showing arrangements of the LED modules; FIG. 11B, a diagram showing diffusion portions in which prism patterns are concentrically arranged, when viewed from the front surface side of the diffuser board; and FIG. 11C, a diagram when viewed from the front surface side of the diffuser board, showing diffusion portions each formed by a quadrangular-pyramid-shaped micro lens and prism patterns therearound.

When the light source unit 103a is formed such that a LED module 104 is arranged in an oblique direction from the LED modules 104 at grid points as shown in FIG. 11A, it is preferable that a diffusion portion 103b1 also be formed in an oblique direction from the diffusion portions 103b1 formed at grid points on the diffuser board 103b as shown in FIG. 11B. By arranging diffusion portions 103b1 as shown in FIG. 11B, each of which is composed of concentrically-formed prism patterns P shown in FIG. 7A, it becomes possible to suitably diffuse the light emitted from the obliquely-arranged LED modules 104 in addition to the LED modules arranged in a lattice pattern.

Figure 11C:
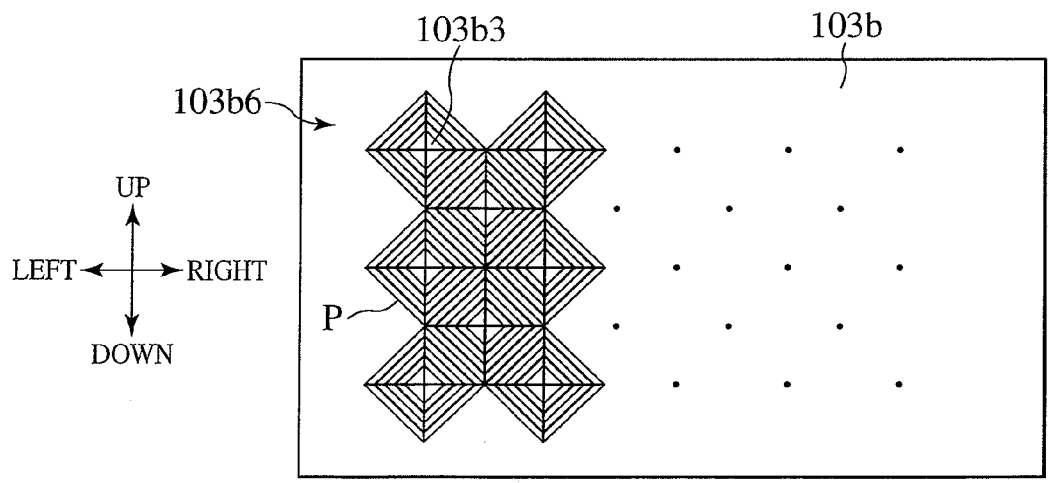
FIG. 11C, a diagram when viewed from the front surface side of the diffuser board, showing diffusion portions each formed by a quadrangular-pyramid-shaped micro lens and prism patterns therearound.

Further, by arranging diffusion portions 103b6 as shown in FIG. 11C, in which the quadrangular-pyramid-shaped micro lenses 103b3 each having an approximately square-shaped bottom face shown in FIG. 8A are arranged at an angle of about 45 degrees with respect to the lateral directions of the diffuser board 103b, and prism patterns P are rectangularly formed around the micro lenses 103b3, it becomes possible to suitably diffuse the light emitted from the obliquely-arranged LED modules 104 in addition to the LED modules arranged in a lattice pattern.

The relation between the shape of the lens 104d (refer to FIG. 4) provided on the LED module 104 (refer to FIG. 4) and the diffuser board 103b will now be explained below.

Figure 12A:
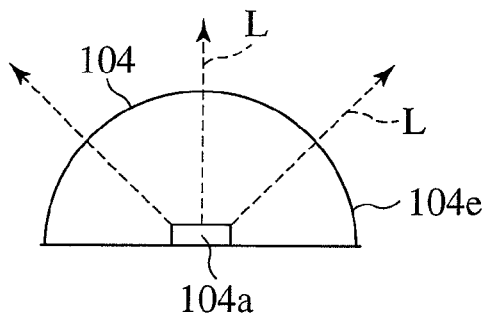
FIG. 12A is a diagram showing a spherical lens.
Figure 12B:
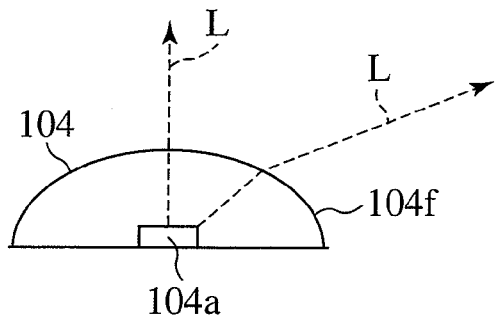
FIG. 12B, a diagram showing a wide-angle lens.
Figure 12C:
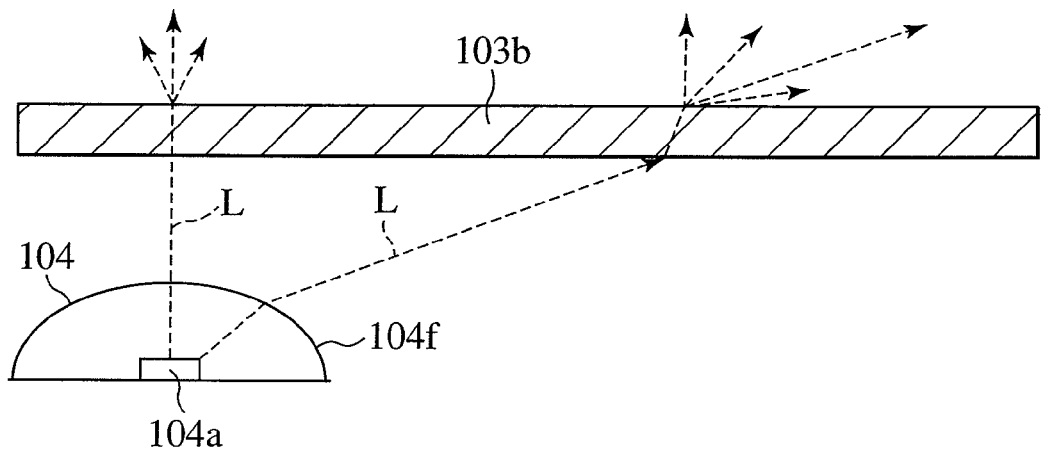
FIG. 12C, a diagram showing a diffusion state of the light by a diffuser board without diffusion patterns.

FIG. 12A is a diagram showing a spherical lens; FIG. 12B, a diagram showing a wide-angle lens; FIG. 12C, a diagram showing a diffusion state of the light incident on a diffuser board without diffusion patterns; and FIG. 12D, a diagram showing a diffusion state of the light incident on a diffuser board with diffusion patterns formed thereon.

If a wide-angle lens 104f as shown in FIG. 12B, which is flatter than the lens 104d shown in FIG. 5 and a spherical lens 104e shown in FIG. 12A, is used for the LED module 104, it is possible to allow the light L to reach a position distant from the LED module 104 as shown in FIG. 12C. However, if a diffuser board 103b without diffusion patterns formed thereon is used, at a position distant from the LED module 104, the output angles formed between the normal line of the diffuser board 103b and the light beams L exiting the diffuser board 103b become larger than those formed right above the LED module 104 as shown in FIG. 12C. Therefore, the output angle distributions of the light beams L from the diffuser board 103b differ at a position right above the LED module 104 and at a position distant from the LED module 104, which thus causes mura.

Figure 12D:
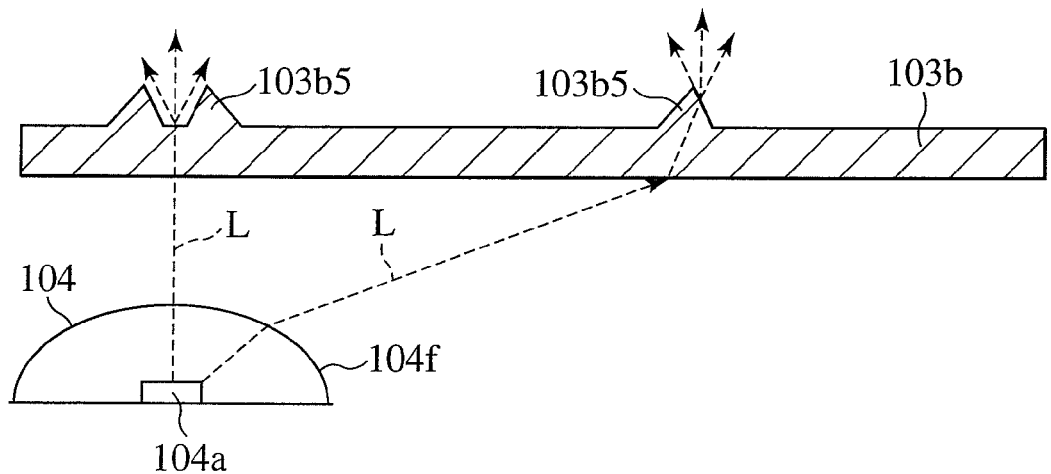
FIG. 12D, a diagram showing a diffusion state of the light by a diffuser board with diffusion patterns formed thereon.
Figure 13A:
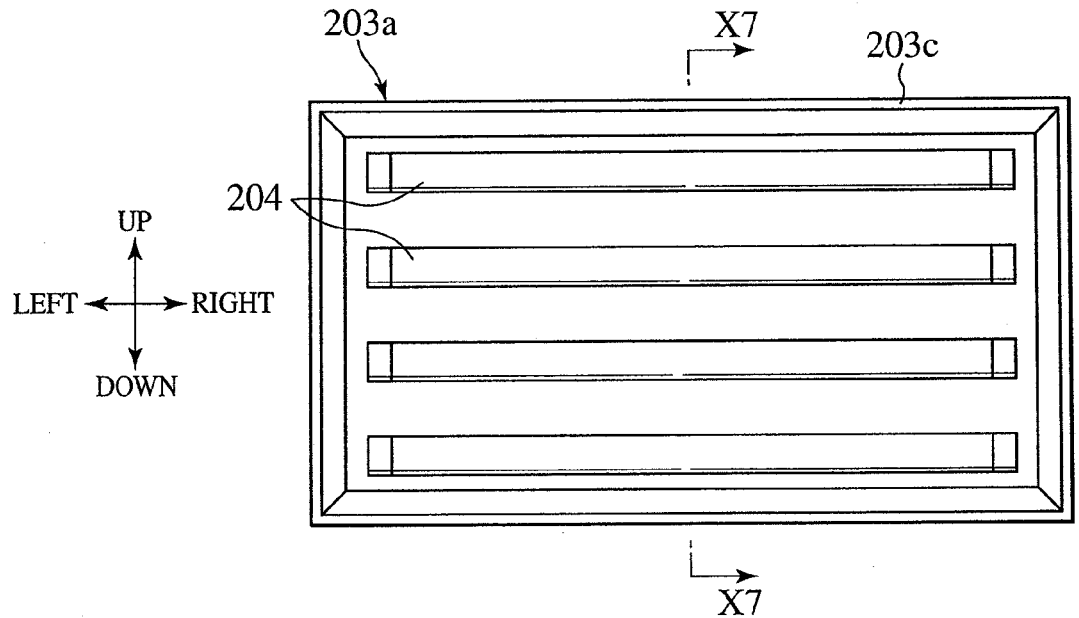
FIG. 13A is a diagram showing a light source unit of a backlight according to the conventional technique, when viewed from the front surface side.
Figure 13B:
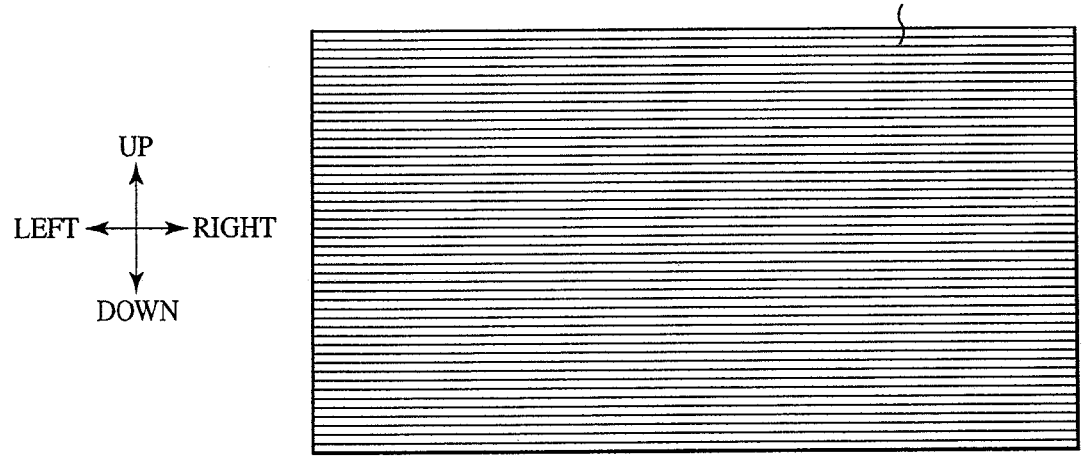
FIG. 13B, a diagram showing a diffuser board according to the conventional technique.
Figure 13C:
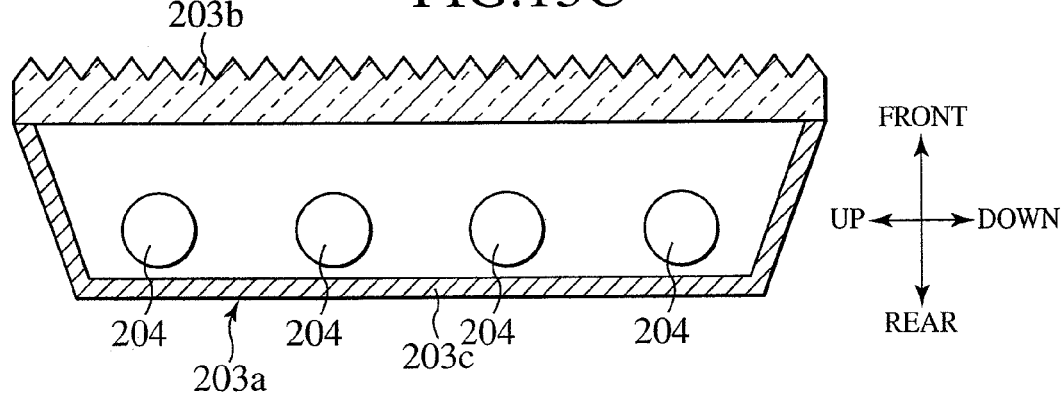
FIG. 13C, a cross-sectional view taken along the X7-X7 line of the FIG. 11A in a state where the diffuser board is provided.

On the other hand, if a circular-cone-shaped or polygonal-pyramid-shaped, for example, quadrangular-pyramid-shaped micro lens 103b5 is formed as a diffusion pattern on the surface of the diffuser board 103b, the light beams L incident on the micro lens 103b5 is refracted in the direction of the normal line of the diffuser board 103b. Therefore, as shown in FIG. 12D, the output angle distributions of the light beams L from the diffuser board 103b approximately equal at a position right above the LED module 104 and at a position distant from the LED module 104.

Thus, when the wide-angle lens 104f shown in FIG. 12B is used, the use of a diffuser board 103b having the micro lenses 103b5 formed on the entire surface thereof makes it possible to prevent mura which is attributable to the output angle distribution.

In order to prevent mura over the entire surface of the diffuser board 103b, it is preferable that diffusion patterns formed by the micro lenses 103b5, etc. be formed over the entire surface of the diffuser board 103b.

Also when diffusion patterns, such as the prism patterns P (refer to FIG. 7) and the pyramid-shaped micro lens 103b3 (refer to FIG. 8) having an approximately square-shaped bottom face, etc., are formed on the entire surface of the diffuser board 103b, the same effect of diffusion can of course be obtained regardless of the arrangement or shape. For example, in FIG. 7A, the same effect of diffusion can be obtained by forming prism patterns P also at a space between the diffusion portions 103b1.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid-crystal display device comprising:
a liquid crystal panel;
a light source unit which illuminates the liquid crystal panel from the back surface thereof; and
a diffuser board which is provided between the light source unit and the liquid crystal panel to diffuse the light emitted by the light source unit;
wherein the light source unit includes a housing having an open front surface and a reflective surface formed inside of the housing, the light source unit including a plurality of point light sources arranged on a surface in the housing opposite to the open front surface so as to emit light toward the open front surface;
wherein the diffuser board is provided so as to cover the open front surface of the housing, the diffuser board having diffusion portions formed by diffusion patterns at a surface of the diffuser board facing the liquid crystal panel and having surfaces which are convexly raised at positions corresponding to the positions of the point light sources so that some of light beams emitted from the light source unit are reflected from the diffusion portions of the diffuser board and others of the light beams penetrate the diffuser board toward the back surface of the liquid crystal panel;
wherein each of the diffusion patterns includes a plurality of micro lenses formed by the surface of the diffuser board being raised to have a circular cone shape or a pyramid shape; and
wherein the plurality of micro lenses are arranged adjacent to one another so as to be positioned around a central position corresponding to the position of the point light source, the plurality of micro lenses differing in shape at a position near the central position and at a position distant from the central position, the plurality of micro lenses which are positioned equidistant from the central position having substantially the same shape.

2. The liquid-crystal display device:
according to claim 1, wherein the point light sources are LEDs each covered by a wide-angle lens.

3. The liquid-crystal display device according to claim 2, wherein the diffuser board is arranged so as to cover the open surface of the housing, and the plurality of micro lenses are arranged adjacent to one another around the central portion of the wide-angle lens so that the apexes of the plurality of micro lenses which are adjacent to one another surround the central portion of the wide-angle lens, when viewed from the normal-line direction with respect to the surface of the diffuser board.

4. The liquid crystal display device according to claim 2, wherein each of the plurality of micro lenses has the circular cone shape or the pyramid shape.

5. The liquid crystal display device according to claim 2, wherein at least two of the plurality of micro lenses are arranged adjacent to one another along at least one circumferential path surrounding the predetermined point on the diffuser board.

6. The liquid crystal display device according to claim 2, wherein only the wide-angle lens is disposed between each LED and the diffuser board having the diffusion patterns.

7. The liquid crystal display device according to claim 2, wherein the wide-angle lens of each LED and the plurality of micro lenses of the diffuser board enable prevention of mura attributable to output angle distribution of light beams from the diffuser board.

8. The liquid crystal display device according to claim 1, wherein each of the plurality of micro lenses has the circular cone shape or the pyramid shape.

9. The liquid crystal display device according to claim 1, wherein at least two of the plurality of micro lenses are arranged adjacent to one another along at least one circumferential path around the central position.

* * * * *